United States Patent Office 3,266,184
Patented August 16, 1966

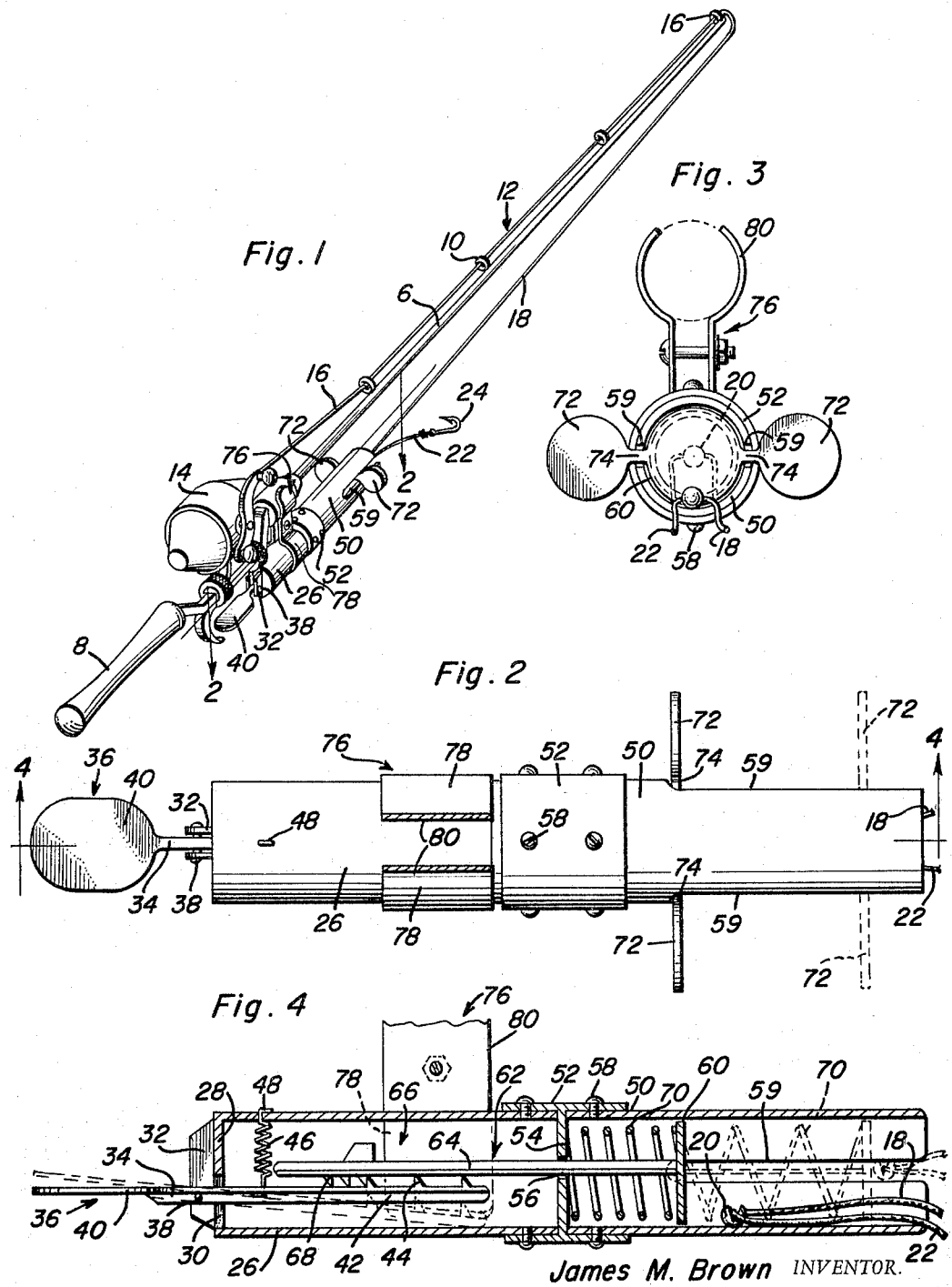

3,266,184
SPRING-LOADED LINE CASTING GUN
James M. Brown, 914 2nd Ave. SE., Minot, N. Dak.
Filed Nov. 2, 1964, Ser. No. 408,215
4 Claims. (Cl. 43—19)

The present invention relates to a manually controlled mechanical casting device for a baited and sinker-equipped end of a fishing line and which functions to unreel the line in the direction in which the discharge end of the device is aimed.

Casting devices for attachment to the handle portion of a fishing rod are not new. Typical prior art examples generally analogous to the herein disclosed invention are revealed in a patent to Raider, No. 3,026,644 of March 27, 1962, which shows a casting gun attached to a fishing rod and which functions to receive the sinker equipped end of the line and embodies spring loaded casting means. Another example, also generally similar to that herein comprehended is the casting gun in the Gray Patent No. 1,054,916 of March 4, 1913.

It is an object of the present invention to structurally, functionally, and in other ways improve upon rod attached spring loaded line casting guns such as, for example, the types covered in the aforementioned prior patents. In carrying out the present invention a specially constructed elongated cylindrical barrel is provided with means whereby it can be clamped on the handle of the fishing rod to assume an operating position in general parallelism to the rod. This barrel is divided by a partition into forward and rearward chambers, the forward chamber being adapted to receive the sinker-equipped portion of the fishing line in a manner to be acted upon and projected by the head of a spring loaded plunger operating in said chamber.

Novelty is also predicated on the rearward chamber wherein a rod part of the plunger is accommodatingly received and provided with detents. These detents are selectively engaged by retaining detents provided on a pivotally mounted spring biased latching and retaining finger.

An end portion of the latching finger has a trip which is availably mounted on a conveniently accessible handle portion of the fishing rod.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

FIGURE 1 is a view in perspective showing a conventional fishing rod, reel, line threaded and positioned on the rod in front of the reel and with the hook and sinker-equipped end located for casting in the forward end of the spring loaded line casting gun;

FIGURE 2 is a view on an enlarged scale taken on the plane of the horizontal section line 2—2 of FIGURE 1;

FIGURE 3 is a view showing the gun attachment by itself and looking at the same in a direction from right to left in the manner shown in FIGURE 1; and FIGURE 4 is a view with parts in section and elevation taken on the plane of the central longitudinal section line 4—4 of FIGURE 2.

Referring now to the views of the drawing and with reference to FIG. 1 the fishing rod is denoted at 6, is provided at its inner end with a handle 8 and with line guide eyes 10 for the fishing rod 12. The portion of the line being discharged from the conventionally attached reel 14 is denoted at 16 and is threaded through the eyes and through and beyond the outer line guide eye 16 where it is returned as at 18 and is provided with a split shot sinker 20 and a terminal end portion 22 equipped with a conventional fishhook 24 which when in use is properly baited.

The novel spring loaded line casting gun comprises an attachment and is readily applicable to and removable from the handle portion of the fishing rod.

To satisfactorily achieve the results desired the casting gun comprises a horizontally elongated barrel. More specifically this barrel has an inner or rearward barrel section 26 (FIGS. 2 and 4) which is closed at its inner end as at 28, said closed end having a slot 30 therein and being provided exteriorly with a pair of outstanding spaced parallel flanges 32 between which a portion 34 of a latching finger 36 is arranged and pivotally mounted at 38. There is a projecting outer end portion on the finger which is fashioned into a suitable fingergrip or trip 40. The major portion of the finger denoted at 42 projects into the chamber portion of the barrel and is provided with longitudinally spaced selectively usable teeth 44 which provide detents. The overall finger is also referred to as a pivotally mounted spring biased finger. To accomplish this, a coil spring 46 is provided, said spring being attached at its lower end to an enclosed portion 42 of the finger. The upper end of the coil spring is suitably anchored at 48 on the cylindrical part of the barrel. The forward cylindrical part of this barrel is denoted at 50 and has a rearward end aligned with the forward end of the barrel section 26. As a matter of fact, the adjacent ends of the barrel sections are fitted telescopically into a coupling, sleeve or collar 52 having a centralized partition 54 therein. The partition is centrally provided with a guide hole 56. Telescoping ends are riveted or otherwise fastened in place as at 58 on opposite sides of the divider. The forward open end portion of the barrel is provided with diametrically opposite slots 59 which open through said forward end as shown in FIG. 4. This slotted barrel section provides a chamber for the headed end portion 60 of a spring loaded plunger 62. The rod portion 64 extends slidingly through the guide hole 56 and into the first-named chamber 66. This rod portion is provided with lugs or teeth 68 which provide detents and which are selectively and releasably engageable with the detents 44. There is a coil spring 70 provided and this is confined in the chamber portion of the barrel section 50. The spring surrounds the plunger rod and bears at one end against the head 60 and at the other or lefthand end against the divider or partition 54. It will be noted that the plunger head is provided exteriorly of the slotted portion of the barrel with a pair of outstanding disk-like members 72 which provide satisfactory triggers and which have restricted neck portions 74 connected with diametrically opposite marginal portions of the plunger head. These necks are slidable back and forth in guide slots 59 which are provided therefor in the manner shown in FIG. 4.

Any suitable adapter or attaching device can be used for detachably and adjustably mounting the gun on the fishing rod so that the gun is in spaced parallel relation in the manner shown in FIG. 1. The means is identified here, generally speaking, as a bracket 76 comprising suitably shaped grips 78 embracing the barrel and having bolt-connected clip portions 80 which embrace and are thus yieldingly or otherwise securely but releasably attached to an adjacent part of the fishing rod.

Inasmuch as it is old in the art to combine a cylindrical or barrel-type spring-loaded casting gun with the handle portion of a fishing rod and use clamping means for assembling or mounting the gun it will be understood that the invention herein disclosed has to do with the gun in the form and construction shown with particularity in FIGS. 2 to 4, inclusive and as hereinafter claimed.

It will be obvious that the gun is clamped or bracketed on the handle portion of the fishing rod in the manner shown and when thus applied all that the angler has to do is to bend the baited hook-equipped portion of the line on itself and to replace the sinker-equipped part in the open chamber portion of the barrel. This is shown in FIG. 4 which also shows that the plunger has been cocked against the tension of the spring by forcing the headed rod to assume the position illustrated in FIG. 4. In so doing the teeth or detents 68 on the rod portion 64 ride over the retaining teeth 44 on the retainer finger 36, the then coacting detents being held in the relationship shown in FIG. 4 by way of the latch holding spring 46. When it is desired to make the cast and "fire" the gun it will be obvious that a simple trip action will release the trip 40 against the tension of the spring 46. The spring loaded plunger 62 then comes into play and forces the sinker-equipped end of the line (FIG. 4) outwardly and forcibly in the manner and in the direction desired.

The foregoing is considered as illustrative only of principles of the invention. Further, since numerous modifications and changes will readily occur to those skilled in the art, it is not desired to limit the invention to the exact construction and operation shown and described, and accordingly all suitable modifications and equivalents may be resorted to falling within the scope of the invention as claimed.

What is claimed as new is as follows:

1. A baited line casting gun for attachment to the handle-equipped end of a rod and reel, said gun comprising an elongated barrel, a divider fixed in a median portion thereof converting an interior portion of said barrel into a forward chamber and a rearward chamber, means for mounting said barrel in a ready-to-operate casting position on the fishing rod, a baited line casting plunger comprising a head slidable in said forward chamber, said head being provided with a rod passing slidably through said divider and into the rearward chamber, said rod being provided with detents confined in said rearward chamber, a spring biased latch pivotally mounted on a rearward portion of said barrel and having a forward end portion projecting into said rearward chamber and provided with detents releasably engageable with the detents on the plunger rod, a rearward portion of said latch projecting beyond the corresponding end of said barrel and being provided with a fingergrip providing a trip for conveniently releasing said latch, and a coil spring surrounding said rod and interposed between the plunger head and divider.

2. A baited line casting gun comprising a rearward barrel section providing a chamber, said section being closed at a rearward end, said closed end having a slot therein, a latch finger having a median portion pivotally mounted on said closed end, a projecting rearward portion terminating in a finger-actuated trip, a forward end portion passing through said slot into said chamber and provided with selectively usable detents, a forward barrel section aligned with the forward end of said rearward barrel section and secured in axial alignment therewith, divider means separating adjacent end portions of said barrel sections from each other and forming the hollow portion of the forward barrel section into a second chamber, said divider means having a guide opening, a plunger comprising a head slidable in the chamber of the second-named barrel section, said plunger also having a rod, said rod being operable through said guide opening and projecting into the chamber of the first-named barrel section and provided with detents cooperable with the first-named detents, and a coil spring surrounding the plunger rod and confined between the head of the plunger and divider means in the chamber of said forward barrel section.

3. The structure defined in claim 2 and wherein said forward section is provided with diametrically opposite slots opening at forward ends through the corresponding end of said barrel section, a pair of coplanar outstanding disk-like finger members, said finger members being attached to diametrically opposite marginal portions of said plunger head and being operable in their respectively cooperating slots.

4. The structure defined in claim 3 and wherein said divider means comprises a sleeve and a divider plate carried by an intermediate portion of said sleeve, the adjacent end portions of said barrel sections being axially aligned and fitting into the sleeve and abutting opposite sides of said divider plate.

References Cited by the Examiner
UNITED STATES PATENTS

| | | | |
|---|---|---|---|
| 764,853 | 7/1904 | Kimberlin | 43—19 |
| 1,124,726 | 1/1915 | Gray. | |
| 1,598,323 | 8/1926 | Spencer | 43—19 |
| 2,001,449 | 5/1935 | Bergstrom | 124—16 |
| 2,225,719 | 12/1940 | Shotton | 43—19 |
| 2,817,178 | 12/1957 | Keck | 43—19 |
| 3,026,644 | 3/1962 | Raider | 43—19 |

SAMUEL KOREN, Primary Examiner.

D. J. LEACH, Assistant Examiner.